Dec. 9, 1924.
E. RIETZ
GRAPHITE CRUCIBLE
Filed Nov. 22, 1916
1,518,818
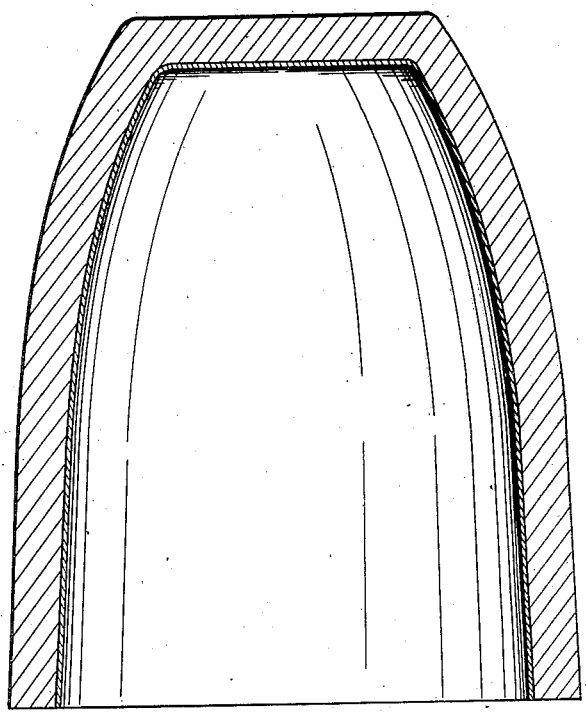
Inventor
Edward Rietz
By
B. Singer. Atty.

Patented Dec. 9, 1924.

1,518,818

UNITED STATES PATENT OFFICE.

EDUARD RIETZ, OF SAO PAULO, BRAZIL.

GRAPHITE CRUCIBLE.

Application filed November 22, 1916. Serial No. 132,876.

*To all whom it may concern:*

Be it known that I, EDUARD RIETZ, a subject of the King of Prussia, residing at Sao Paulo, in the Republic of Brazil, have invented a new and useful improved Graphite Crucible, of which the following is a specification.

My present invention relates to a new graphite crucible. The object of the new crucible is to offer greater resistance to slags, chemical reagents and the like and to assure a considerably longer time of use than existing graphite crucibles.

The characteristic feature of the new crucible is that in addition to graphite and other fireproof substances, such as clay, chamotte, or sand, compounds of the so called titanium group of metals, that is compounds of zirconium and thorium are used. The amount of the compounds of the titanium group of metals added is between 5 to 40%, and the oxides or salts or the ores may be used.

The zirconium compounds have been found to be specially suitable for the purpose. Zirconium oxides, either natural or artificial, or zirconium silicates, natural or artificial, or other salts may be used. These substances are preferably added to the other constituents of the crucible, such as graphite, clay, chamotte, sand or broken crucibles, in a powdered condition. The various substances are mixed in a powdered form and from the mixture the crucible is formed. Special binding agents, such as fluxes, or the like, may be added in order to facilitate the moulding. The crucible is formed, and, if necessary, it is burnt. A special mixture consists, for example, of 35 parts of zirconium, 40 parts of graphite, 25 parts of clay. By adding oxides of the titanium group the clays otherwise used in connection with graphite are partly replaced, so that less clay, chamotte, sand is required than usual. The proportions cited can of course be altered. For example 10% zirconium 70 parts of graphite and 20 parts of clay, chamotte, and sand may be used. After being formed the crucible is burnt, for example, at a temperature of 1000° C.

In certain cases zirconium oxide and thorium oxide may be used. The main thing is in all cases that elements of the titanium group should be used and that in individual cases, especially zirconium and selectively also thorium should be utilized.

In carrying out the invention a single compound may be used, but still several compounds of the titanium group may be used together.

One manner of making the new crucible consists in providing a crucible made from a mixture of graphite, clay, zirconium or an oxide of the titanium group with a layer on the inner side made from a mixture of compounds of the titanium group of metals, to which a binding agent has been added, and in burning this layer at a suitable temperature. By so doing the fireproof and acid proof property of the crucible is increased.

In the accompanying drawing which is a sectional view of a crucible, the crucible is indicated at 1 and the inside layer of rare earth and binder is indicated at 2.

Fireproof vessels have already been made from zirconium oxide and thorium oxide without graphite. Both pure and natural zirconium oxides have been used for the purpose. Such fireproof vessels (crucibles, stones, muffles) are however not durable. My present invention does not relate to the production of all kinds of vessels out of zirconium compounds, but to crucibles which contain graphite, the usual additional substances and oxides of the titanium group.

The crucibles may be used to reduce metals from their compounds, so that finally copper and the like are produced.

What I claim and desire to secure by Letters Patent of the United States is:—

1. The described crucible consisting of graphite and compounds of the titanium group of metals.

2. The described crucible consisting of graphite, fireproof additions, and compounds of the titanium group of metals.

3. The described crucible consisting of graphite and zirconium compounds.

4. The described crucible consisting of graphite, fireproof substances such as for instance, clay, and chamotte, and zirconium compounds.

5. The described crucible consisting of graphite, compounds of the rare earths, such as oxide of zirconium and oxide of thorium and a layer of compounds of the rare earths with a binding agent.

6. The described crucible consisting of graphite, fireproof substances, compounds of the titanium group such as oxide of zirconium and oxide of thorium, and a layer of compounds of the rare earths with a binding agent.

7. The described crucible consisting of graphite and zirconium compounds with a layer of zirconium compounds and a binding agent.

8. The described crucible consisting of graphite, fireproof substances, zirconium compounds, and a layer of zirconium compounds with a binding agent.

In testimony whereof I have signed my name to this specification in the presence of two subscribing witnesses.

EDUARD RIETZ.

Witnesses:
 FRANCIS R. STEWART,
 W. W. BRINKMAN.